(12) United States Patent
Sheikh

(10) Patent No.: US 9,064,265 B1
(45) Date of Patent: Jun. 23, 2015

(54) SYSTEM AND METHOD FOR LOCATING ITEMS IN A FACILITY

(76) Inventor: Babak Sheikh, Weston, FL (US)

( * ) Notice: Subject to any disclaimer, the term of this patent is extended or adjusted under 35 U.S.C. 154(b) by 91 days.

(21) Appl. No.: 13/559,844

(22) Filed: Aug. 29, 2012

(51) Int. Cl.
*G06F 17/00* (2006.01)
*B60Q 1/48* (2006.01)
*G06Q 30/02* (2012.01)

(52) U.S. Cl.
CPC ...................... *G06Q 30/02* (2013.01)

(58) Field of Classification Search
CPC ..... G06Q 30/0639; G08G 1/14; G08G 1/142; G08G 1/144; G01S 5/02
USPC ................. 235/375, 492; 340/932.2
See application file for complete search history.

(56) References Cited

U.S. PATENT DOCUMENTS

| 8,077,090 | B1 | 12/2011 | Chintalapudi et al. |
| 8,155,673 | B2 | 4/2012 | Alizadeh-Shabdiz et al. |
| 8,180,369 | B1 | 5/2012 | Sheikh |
| 8,463,299 | B1 * | 6/2013 | Hladik, Jr. ..................... 455/457 |
| 2003/0034399 | A1 * | 2/2003 | Wilz, Sr. et al. ......... 235/462.45 |
| 2006/0208860 | A1 | 9/2006 | Park et al. |
| 2007/0008130 | A1 * | 1/2007 | Ashwood Smith ........ 340/572.1 |
| 2010/0030624 | A1 * | 2/2010 | Vanska et al. ................... 705/10 |
| 2010/0106590 | A1 * | 4/2010 | Fuzell-Casey et al. .... 705/14.25 |
| 2011/0187591 | A1 | 8/2011 | Walker, Sr. |
| 2011/0202394 | A1 * | 8/2011 | Borom et al. ................ 705/14.1 |
| 2012/0072106 | A1 | 3/2012 | Han et al. |
| 2012/0088524 | A1 | 4/2012 | Moldavsky et al. |

* cited by examiner

*Primary Examiner* — Michael G Lee
*Assistant Examiner* — Laura Gudorf
(74) *Attorney, Agent, or Firm* — Ronald V. Davidge

(57) ABSTRACT

A portable electronic device connected over a network to a server is used to guide a person using the device to one or more selected items within a facility, with the location of the device being tracked using radio frequency signals generated within the facility or GPS signals from satellites. The process of connecting to the server may be started when a bar code is photographed using a camera within the device, or when an RFID tag is read by a reader within the device. Location processes are provided for finding a vehicle left in a parking area, and for locating items that are additionally described in messages displayed on the electronic device.

11 Claims, 7 Drawing Sheets

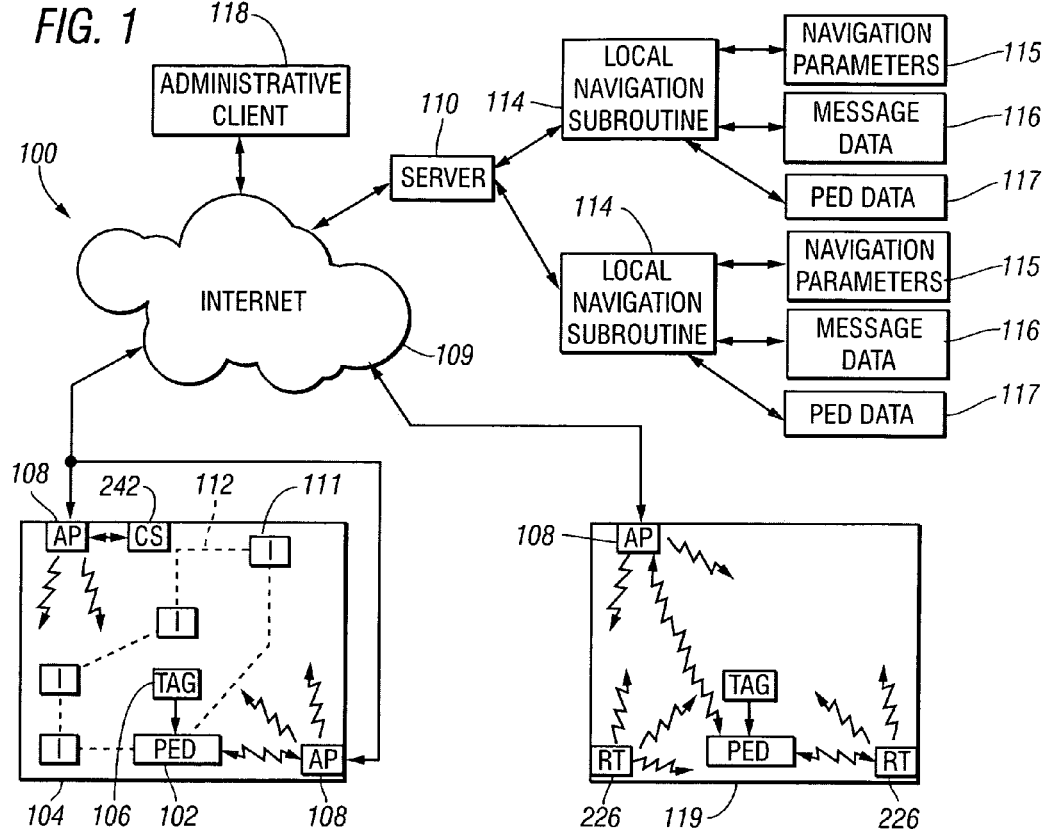
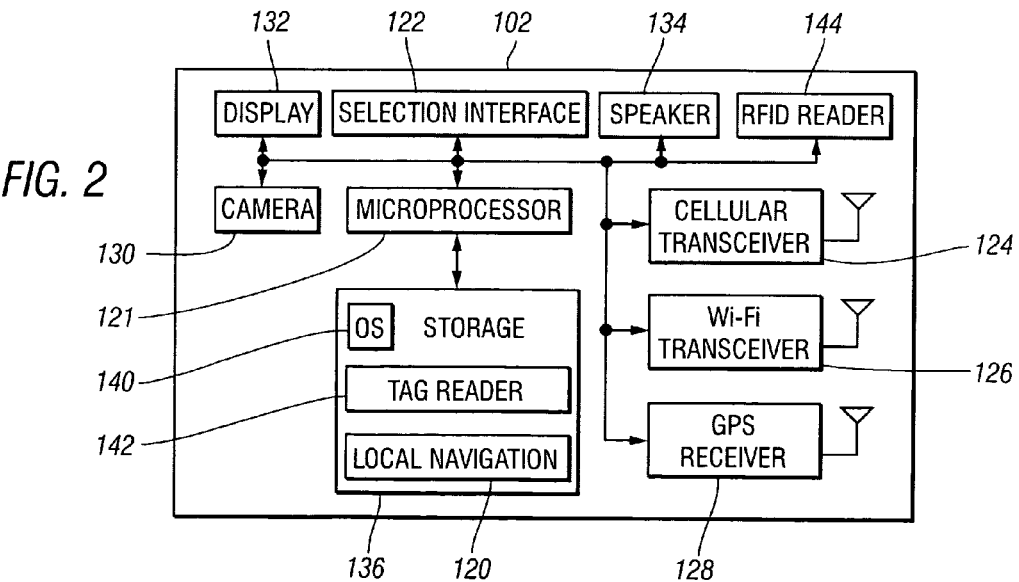

SYSTEM AND METHOD FOR LOCATING ITEMS IN A FACILITY

RELATED APPLICATIONS

Not Applicable

FEDERALLY SPONSORED RESEARCH OR DEVELOPMENT

Not Applicable

BACKGROUND OF THE INVENTION

1. Field of the Invention

This invention relates to

2. Summary of the Background Information

A modern smartphone is typically provided with a conventional GPS receivers and with a transceiver for sending and receiving radio-frequency signals through an access point that sends and receives data over the Internet. It is known that a conventional GPS receiver does not function properly in many indoor areas because of the attenuation of satellite signals by the walls and roofs of structures and because many elements within buildings cause reflections of the satellite signals. While the conventional GPS system was not designed for use in indoor areas, a number of current attempts to modify the GPS system to provide indoor capabilities are now being made.

It is additionally known that WiFi signals from access points presently located within many buildings can be used to locate a modern smartphone at an accuracy within 2.5 meters, and that the internal compass and accelerometers within a conventional smart phone can additionally used to generate location data. Positioning data to be used in developing a mobile app for use within a specific indoor environment can now be generated by a server from data generated in the actual indoor environment with a smartphone receiving WiFi signals received therein.

A modern smartphone is typically provided with a camera, and many users of smartphones have downloaded an app for reading QR codes (a trademark taken from "quick response"), which are of a particular type of matrix (two-dimensional) bar code, originally used to track vehicles during assembly, and now widely used for advertising purposes. Such an app contacts the Internet through the communication capabilities of the smartphone and connects the smartphone with a web site identified by data stored within a QR code that has been photographed using the camera within the smartphone. For example, a QR code placed near a product displayed within a retail store may be used to connect the smartphone with a website providing additional information about the product including video demonstrations, etc.

RFID (radio frequency identification) tags have also been used to provide indoor, as well as outdoor, location information. For example, a visitor to a museum may be given a portable device including an RFID reader and an audio player having a number of stored audio messages describing exhibits within the museum, each of which is played when the portable device is brought into proximity with an RFID tag identifying the corresponding exhibit. Alternatively, the portable device is provided with communications capabilities allowing a server to be connected, with the server then providing audio and/or video information describing the exhibit identified by the RFID tag.

SUMMARY OF THE INVENTION

In accordance with a first aspect of the invention, a method is provided for finding one or more items within a facility of provided. The method includes: connecting a portable electronic device to a server over a network, generating a map of the facility from a data structure accessed by the server; receiving a user selection describing an item to be visited within the facility; determining a location of the item to be visited from a data structure accessed by the server, generating a message describing the item to be visited from a data structure accessed by the server; displaying the message describing the item to be visited on the portable electronic device; and displaying an image of the map of the facility on the portable electronic device, wherein the map includes a cursor representing the location of the portable electronic device within the facility and an icon representing the location of the item.

Preferably, the method includes receiving user selections describing a plurality of items to be visited within the facility, determining a location of each of the items from the data structure accessed by the server, and displaying a message describing one or more of the items to be visited on the portable electronic device, while the image of the map includes icons representing the location of each of the items. The method may additionally include storing user selections in a data structure accessed by the server, determining that user selections of items have been previously made with the portable electronic device from data previously stored within the data structure, displaying data representing previously selected items on the portable electronic device. A list of items within the facility may be displayed, with the user selection of items to be visited being made from the list, and with written descriptions of the previously selected items being highlighted on the list.

Preferably, the method additionally comprises determining a path from the location of the portable electronic device within the facility to visit each of the items in the plurality of items, with the image of the may additionally including a line representing the path. Preferably the data describing a location of the portable electronic device within the facility is repeatedly generated, with the cursor being moved on the displayed image of the map to show movement of the portable electronic device within the facility, and with messages being displayed describing items determined to be in close proximity to the portable electronic device as it is moved within the facility.

In accordance with a second aspect of the invention, a method for finding one or more items within a facility is provided, with the method comprising: photographing a bar code within the facility with a digital camera to form an input signal; receiving the input signal within a computing system in a portable electronic device; generating a server address on a network from the input signal; connecting the portable electronic device to a server over the network at the server address; receiving a user selection describing an item to be visited within the facility; receiving a user selection describing an item to be visited within the facility; determining a location of the item from a data structure accessed by the server; determining a location of the portable electronic device within the facility; and displaying an image of the map of the facility on the portable electronic device, wherein the map includes a cursor representing the location of the portable electronic device within the facility and an icon representing the location of the item.

For example, the facility includes a parking area, with each of the bar codes in the plurality of bar codes is located adjacent one or more parking spaces. Then, the method includes an initialization process, performed when a vehicle is left within the parking area and a vehicle location process, performed to find the vehicle within the parking area, with data describing the location of the item to be visited (the vehicle) being stored within the portable electronic device during the initialization process, and with the vehicle location process is started by a user selection made using the portable electronic device. Preferably, a stored location icon is displayed on the portable electronic device in response to storing the data describing the location of the item to be visited, with the vehicle location process being started by selecting the stored location icon.

In accordance with a third aspect of the invention, a method for finding one or more items within a facility is started by connecting a portable electronic device to a server over a network, either by a first initialization process or by a second initialization process, with the first initialization process including photographing a bar code within the facility with a digital camera to form an input signal, receiving the input signal within a computing system in a portable electronic device, generating a server address on a network from the input signal, and connecting the portable electronic device to a server over the network at the server address; and with the second initialization process including receiving a signal from an access point and connecting to the network through the access point.

BRIEF DESCRIPTION OF THE FIGURES

These and other aspects of the invention will be made apparent by reading the following specification in conjunction with the accompanying drawings, in which:

FIG. 1 is a schematic view of a system configured in accordance with a first embodiment of the invention;

FIG. 2 is a sc schematic view of a portable electronic device within the system of FIG. 1.

DETAILED DESCRIPTION OF THE INVENTION

Figure 3:
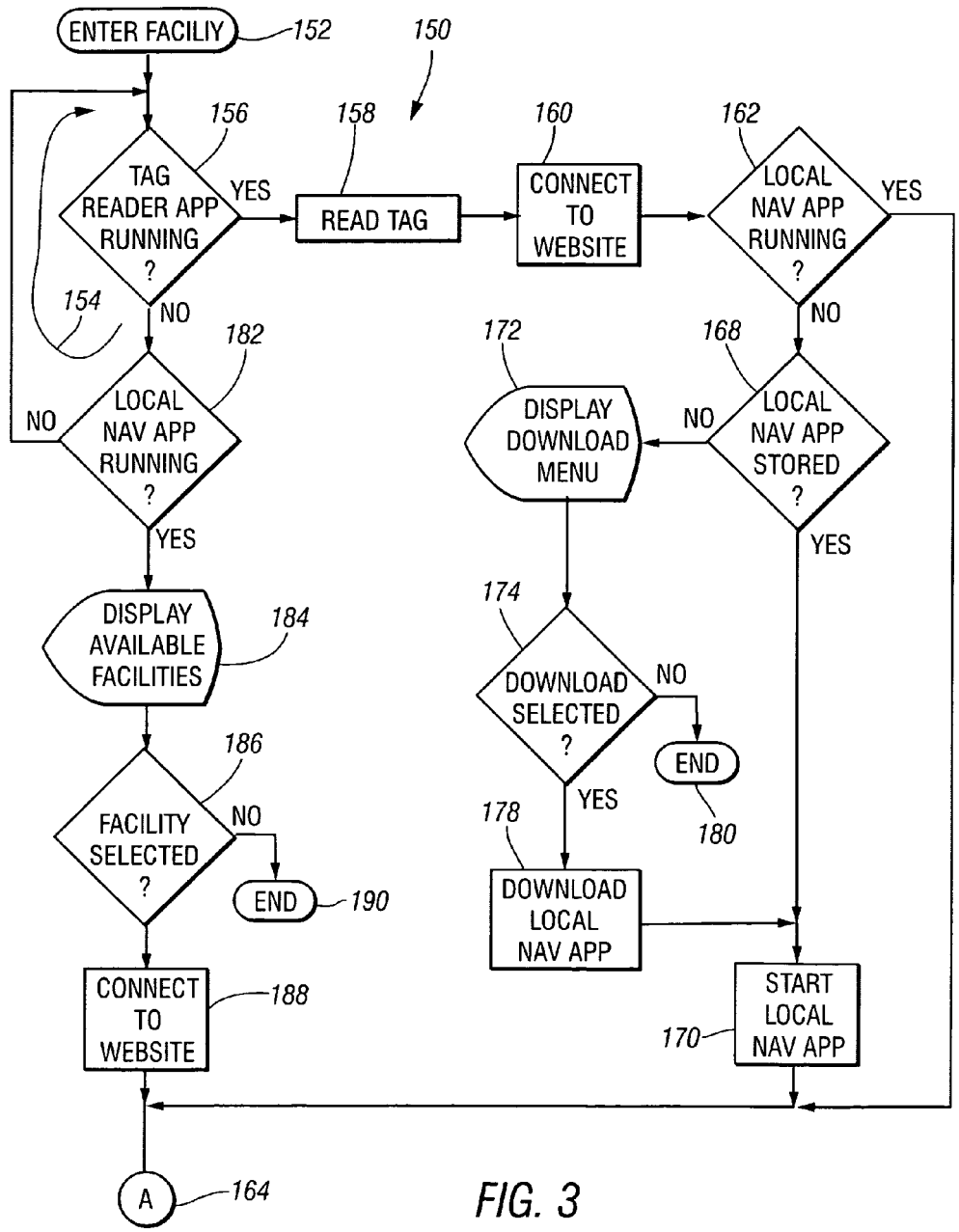
FIG. 3 is a flow chart showing an initialization process for initializing a local navigation process within a facility in the system of FIG. 1.

FIG. 1 is a schematic view of a system 100 configured in accordance with a first version of the invention to provide information to a user of a portable electronic device 102 regarding navigation within a facility 104, which includes a machine readable tag 106 and a plurality of sources of radio frequency signals, such as access points 108, which are each connected to the Internet 109. The machine readable tag 106 is device that can be read with a subsystem within the portable electronic device 102 or attached to the portable electronic device 102. For example, the machine readable tag 106 may be a bar code that can be read by a subroutine executing within the portable electronic device 102 when the tag 106 is photographed by the user (i.e. by the person using the portable electronic device 102). Alternatively, the machine readable tag 106 may be an RFID (radio-frequency identification) tag that is read by a tag reader forming a part of the portable electronic device 102.

A server 110, which may comprise a cloud computing platform, is additionally connected to the Internet 109. In general, the facility 104 is a place where individuals may have trouble finding one or more items 111 to examine or purchase, in which information can be provided to assist in selecting such items 111 and in finding them within the facility 104 by traversing a path 112. The facility 104 may be open, totally enclosed, or partly open and partly enclosed. For example, the facility 104 is a retail store, a shopping center including a number of retail stores, a space within a city providing a number of access points for public use, a parking area, an airport terminal, or a museum. The server 104 has access to a local navigation subroutine 114, which operates in accordance with the invention to provide navigation information and other messages to the portable electronic device 102, using navigation parameters, relating to the physical characteristics of the facility 104, stored within a navigation parameter data structure 115, and providing messages relating to the items 114 from data stored within the message data structure 116. The local navigation subroutine 114 may additionally have access to a smartphone data structure 117, storing data identifying portable electronic devices 102 that have been used within the facility 104 in the past, together with information describing the items 111 that were previously selected using those smartphone.

For example, the system 100 includes an administrative client system 118 that accesses the server 110 to load and update the local navigation subroutine 114, navigation parameters 115, and the message data structure 116. The server 110 may be a cloud computing platform accessed by both the administrative client system 118 and the portable electronic devices 102. The local navigation subroutine 114 then causes the smartphone data structure 117 to be updated with information describing each item 111 selected using a portable electronic device 102. The facility 114 may be one of a plurality of facilities, represented in the drawing by the facility 114 and by a second facility 119, with each of the facilities being associated with a separate local navigation subroutine 114 accessed through the server 110.

FIG. 2 is a schematic view of the portable electronic device 102, which is, for example, a currently available device without modification except for the addition of software in the form of a local navigation app 120 providing for operation in accordance with the invention. The portable electronic device 102 includes a microprocessor 121 configured to receive inputs from a person using the portable electronic device 102 through a selection interface 122, to receive inputs developed from wireless signals received by a cellular transceiver 124, a Wi-Fi transceiver 126, and a GPS receiver 128, and additionally to receive an input from an internal camera 130. The microprocessor 121 is further configured to provide output signals driving a display 132 and a speaker 134 and to execute program instructions from apps stored within data and program storage 136. For example, the selection interface 122 may be one or more of a number of such devices that are well known to those skilled in the art of designing cellular phones, such as a keyboard with physical and a touch screen device used in conjunction with the display 132 to display keys and other images which are touched to provide inputs to the microprocessor 121. Data and instruction storage 136 includes an operating system 140, which is used by the microprocessor 120 to maintain data files, to run apps, and to operate various devices within or attached to the smartphone 103.

Data and instruction storage 136 additionally includes a tag reader app 142 that receives information read from the machine readable tag 106, generates an address of the server 110, and causes the portable electronic device 102 to be connected to the server 110 over a network, such as the Internet 109. For example, the machine readable tag 106 may display a type of bar code known as a QR bar code, while the tag reader app 142 is of a type that is currently widely available as a free download to a smartphone for reading QR bar codes, and for causing the portable electronic device 102 to contact a website identified by data stored within the machine readable tag 106 when the machine readable tag 106 is photographed using the internal camera 130 within a portable electronic device 102, such as a smartphone. Alternately, the machine readable tag may be an RFID tag, while the portable electronic device 102 includes an RFID reader 144, and while the tag reader app 142 causes input data developed from reading the RFID tag to generate an address of the server 110.

The portable electronic device 102 is preferably a conventional smartphone with no modification other than the software modification provided by installing the local navigation app 120. However, the portable electronic device 102 may alternately be another type of device having certain capabilities described in reference to FIG. 2. For example, since operation of the system 100 in accordance with the first embodiment of the invention does not require connection of the portable electronic device 102 to a cellular data network, the portable electronic device 102 may be a laptop computer, with the local navigation app 120 being an application executing on the laptop computer.

FIG. 3 is a flow chart showing an initialization process 150 for initializing a local navigation process to occur within the facility 104. For example, when an individual using the portable electronic device 102 enters the facility 104, communication between the Wi-Fi transceiver 126 within the portable electronic device 102 and the Internet 110 is preferably established by conventional means through the access point 108. Other types of communication with the Internet 110, supported by the portable electronic device 102 and the surrounding environment may be alternately be used, but the use of the access point 108 is preferred because the structures within or adjacent to the facility 104 may block communications not using the access point 108. In accordance with a preferred version of the invention, after entering the facility 104, an individual using the portable electronic device 102 can begin the initialization process 150 either by causing the tag 106 to be read with the tag reader app 142 running or by using the local navigation app 120. In the figure, this choice is shown as proceeding through a loop 154 after entering the facility 104 in step 102. If neither the tag reader app 142 nor the local navigation app 120 is running, the user (i.e. the individual using the portable electronic device 102) can select either of these apps to start running before beginning the initialization process, or, if necessary, the user can download either or both of these apps by conventional processes over the Internet 109.

If the tag reader app 142 is running, as determined in step 156, and if the machine readable tag 106 is read in sep 158, the tag reader app 142 causes the portable electronic device 102 to be connected to the server 110 in step 160. For example, if the machine readable tag 106 is a QR tag, the user photographs the QR tag in step 158, with the tag reader app 142 then causing the portable electronic device 102 to connect to a website hosted by the server 110 in step 160. Then, if a subroutine running within the server 112 determines in step 162 that the local navigation app 120 is running within the portable electronic device 102, the initialization process 150 is successfully ended at exit point A, indicated as 164. On the other hand, if it is determined in step 162 that the local navigation app 120 is not running within the portable electronic device 102, the server 112 makes a further determination in step 168 of whether the local navigation app 120 is stored within the portable electronic device 102. If it is, the local navigation app 120 is started in step 170, with the initialization process 150 being successfully completed at exit point A, indicated as 164. If it is instead determined in step 168 that the local navigation app 120 is not stored within the portable electronic device 102, the display 130 of the portable electronic device 102 displays, in step 172, a menu asking the person using the portable electronic device 102 if he wishes to download the app 120. If it is then determined in step 174 that a selection has been made to download the local navigation app 120, this app 120 is downloaded in step 178, preferably from the server 112. Then the local navigation app 120 is started in step 170, with the initialization process 150 being successfully ended in step 164. If it is determined in step 174 that a selection has been made not to download the local navigation app 120, the initialization process 150 is ended in step 180.

According to a preferred version of the invention, the local navigation app 120 provides a capability for determining whether the portable electronic device 102 is within a facility 104 operating in accordance with the invention, with this determination being made by identifying a portion of the content of an output signal from the access point 108. Therefore, if it is determined in step 182 that the local navigation app 120 is running, this app 120 causes data describing the facility 104 to be displayed in step 184 on the display 132 of the portable electronic device 102. If the portable electronic device 102 is within range of access points from more than one facility, a list of available facilities is presented on the display 132. If the facility 104 is then selected, as determined in step 186, the portable electronic device 102 is connected to the website hosted by server 110 through the Internet 109 in step 188, with the initialization process 150 being successfully ended at end point A, referenced as 164. If the facility 104 is not selected in step 186, the initialization process is ended in step 190.

Since the individual using the portable electronic device 102 is provided with a choice between using a camera 130 to photograph the Bar code tag in and performing a selection of an available facility from a list displayed in step 184, it is understood that the initialization process 150 can be performed by making this selection in step 184 while using a portable electronic device 102 not having a camera 130.

Figure 4:
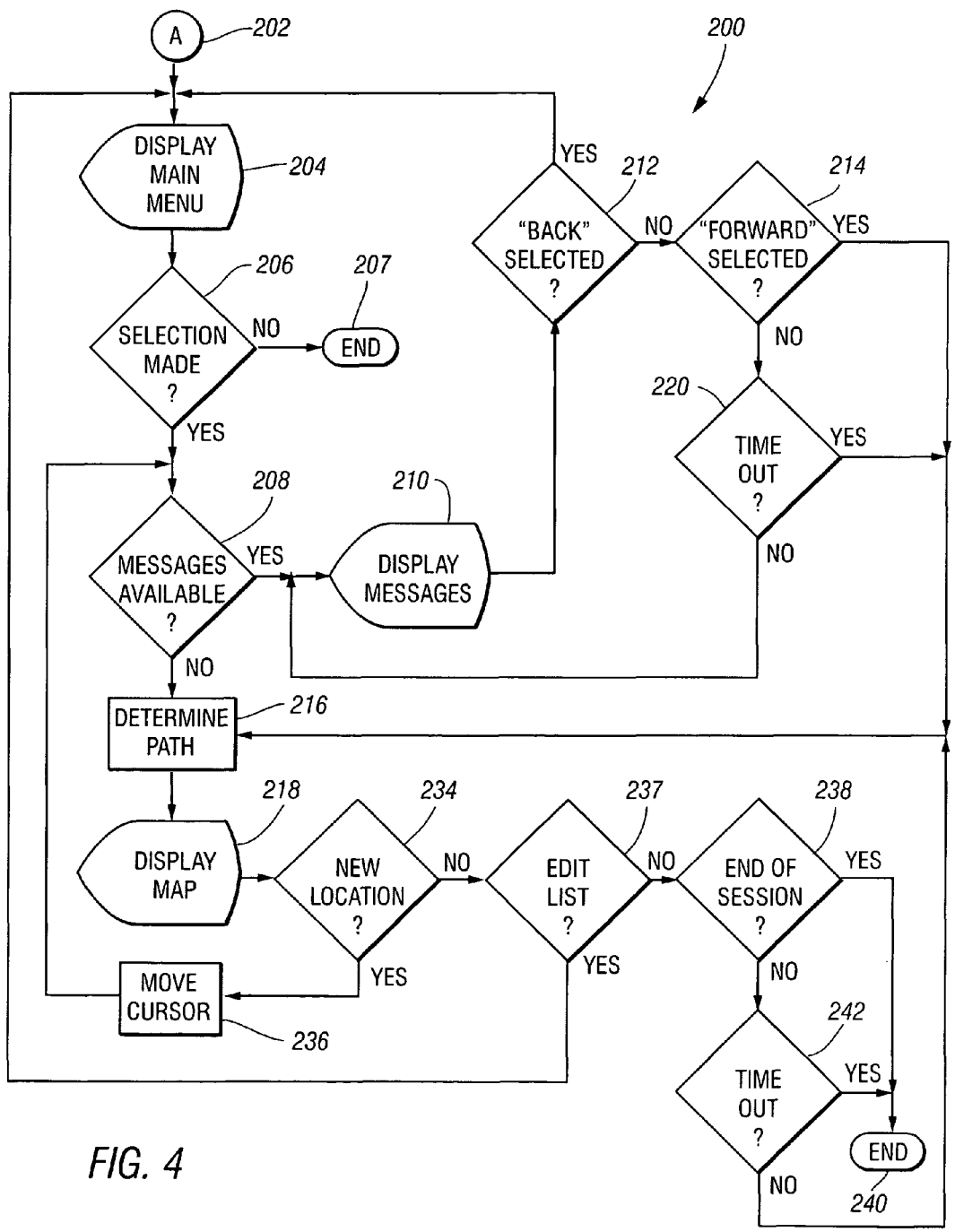
FIG. 4 is a flow chart showing operation of a local navigation process following the initialization process of FIG. 3 within the facility in the system of FIG. 1.

FIG. 4 is a flow chart showing operation of a local navigation process 200, which is entered at an entry point A, referenced as 202, reached directly from exit point B, referenced as 164, upon successful completion of the initialization process 150. The local navigation process 200 begins by causing the display 132 to display a main menu in step 204, showing, for example, a number of items 111 that may be purchased or otherwise visited within the facility 104. For example, data from the portable electronic device data structure 117 is used to highlight graphics displaying items corresponding to previous choices that have been made using the same portable electronic device 102, so that such items can be easily found and selected. The main menu is arranged so that one or more of these items 111 can be selected using the selection interface 122 of the portable electronic device 102, so that the selection interface 122 can further be used to indicate when the selection of multiple items 111 has been completed, and additionally when the individual using the portable electronic device decides not to use the local navigation process 200, which is therefore then ended in step 207. When it has been determined in step 206 that a selection has been completed, a further determination is made in step 208 of whether messages relative to the selected items 111 are available. Such messages may include advertisements covering one or more of the selected items 111, other items or services related to the selected items 111, items determined to have been previously selected using the portable electronic device 102 by examining the portable electronic device data structure 117, and items for which sale prices currently are available. If such messages are available, they are displayed in step 210.

Preferably, the individual using the portable electronic device 102 is provided with a means for controlling the display of messages in step 210 through the use of the selection interface 122. For example, if it is determined in step 212 that a "back" command has been selected, the local navigation process returns to step 204 to again display the main menu, allowing the selection of items 111 to be updated as a result of the messages displayed in step 210. If it is instead determined in step 214 during the display of messages that a "forward" command has been selected, an optimum path for going past each of the selected items is calculated in step 216 and displayed on a map at the portable electronic device display 132 in step 218. If neither the "back" command nor the "forward" command is selected, the display of messages continues until it is determined in step 220 that a time out condition has been reached, with sufficient time having provided to view the messages. Then, a path for visiting all the selected items is calculated in step 216 and displayed as a part of a map of the facility 104 in step 218.

As the portable electronic device 102 is then moved around the facility 104, its location is at least periodically determined, with the location of a cursor on the map shown on the display 132 being varied to represent the location of the portable electronic device 102 within the facility 104. In one version of the invention, the location of the portable electronic device 102 is determined by comparing the signal strengths of two or radio frequency sources placed at various locations around the facility 104. The radio frequency transmitters used for this purpose may each be access points 108, or a single access point 108 may be used with one or more additional radio frequency transmitters 226 provided merely for this purpose, as shown in a second facility 119 in FIG. 1. The time at which the location of the portable electronic device 102 is again determined may be at a fixed time following the previous determination of the location, or it may be at a time when values of the signals used for determining the location, such as the levels of radio frequency signals from the access points 108 and radio frequency transmitters When it is determined in step 234 that the portable electronic device 102 has been moved significantly, the curser is correspondingly moved relative to the map image in step 236, while returning to step 208 to determine if there messages available corresponding to the new location. For example, such messages relate to items at or near the new location of the portable electronic device 102. Preferably, messages are deleted from a list of available messages as they are displayed to avoid showing the same messages repetitively. Thus, while moving with the portable electronic device 102 through the facility 104, the individual using the portable electronic device 102 can revise his choices of items from the main menu by selecting "back" in step 212 as messages are again displayed in step 210, with a new path including these revisions being calculated in step 216 for display in step 218.

While the map is being displayed, the individual using the portable electronic device 102 can choose to edit the list of selected items 111, with such a choice being indicated through the selection interface 122 of the portable electronic device 102. Thus, when a determination is made in step 237 that an edit command has been made, the process 200 returns to step 204 to display the main menu for editing. Preferably, the individual using the portable electronic device 102 is additionally provided with a way to end the local navigation process 200 by using the selection interface 122. For example, he may wish to end the local navigation process 200 after selecting all of the items 111 he desires or when he is ready to leave the facility 104. Thus, when it is determined in step 238 that a selection has been made to end the local navigation process 200, this process 200 is ended in step 240. In addition, since the portable electronic device 102 may be carried away from the facility 104 without ending the local navigation process 200, if it is determined in step 242 that a significant time has gone by without receiving an input from the portable electronic device 102, the local navigation process is ended in step 240.

Various activities described in reference to FIGS. 3 and 4 are performed with the portable electronic device 102 in communication with the server 110. It is understood that process steps within these activities are performed partly within the server 110 through the operation of the local navigation subroutine 114 and partly within the portable electronic device 102 through operation of the local navigation program 120. Optionally, the facility 104 may include a facility-based computer system 242, connected to the access point 108, which shares process steps within these activities with the server 110 and with the portable electronic device 102.

Figure 5:
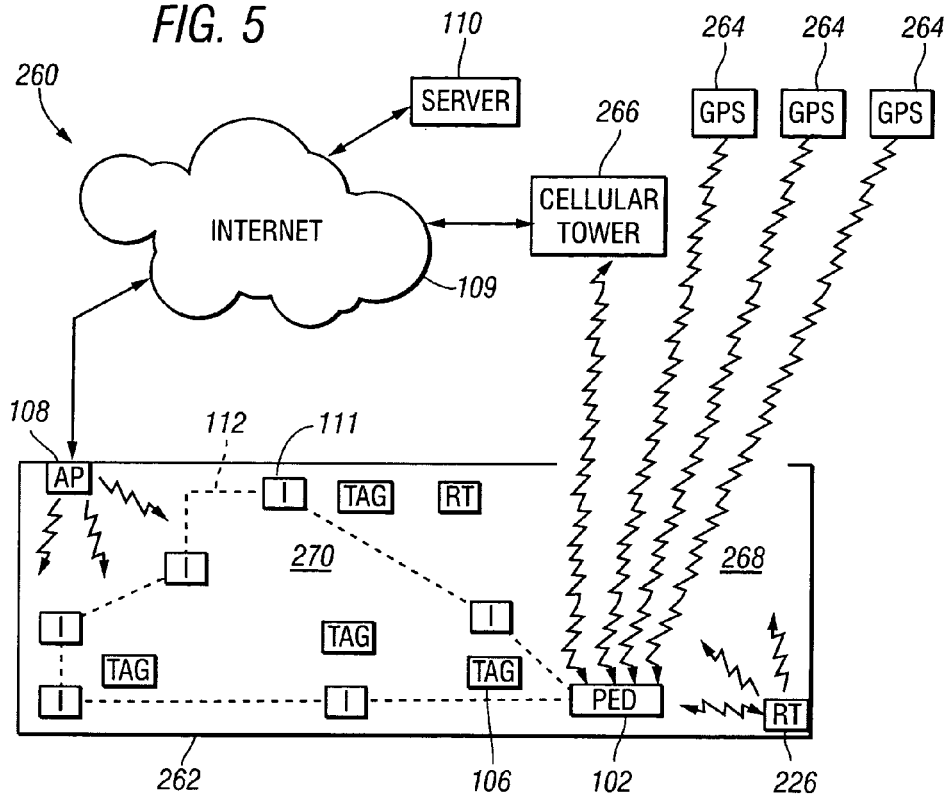
FIG. 5 is a schematic view of a system configured in accordance with a second embodiment of the invention.

FIG. 5 is a schematic view of a system 260 configured in accordance with a second embodiment of the invention to provide multiple modes of determining a location within a facility 262 and multiple modes for communication between the portable electronic device 102 and the server 110. For example, the portable electronic device 102 within the system 262 is a conventional smartphone, having a GPS receiver 128 and a cellular transceiver 124, as shown in FIG. 2, which is therefore capable of determining its location from signals received from a plurality of satellites 264 within the global positioning system (GPS), and which is further capable of determining or refining its position by triangulation using signals received from two or more cellular towers 266. A conventional smartphone is capable of communicating through the cellular transceiver 124 with a high-speed data network provided through a cellular tower 266, in addition to being capable of communicating through the Wi-Fi transceiver 126 with an access point 108. One problem with using signals from GPS satellites 264 and from the cellular tower 166 arises from the fact that the reception of such signals is often unreliable within covered structures due to the reflection and attenuation of the signals by elements within the structures. Within the system 260, this problem is alleviated by providing for the use of multiple modes for determining the location of the portable electronic device 102 and for communication between the portable electronic device 102 and the server 110.

In the example of FIG. 5, the facility 262 includes an open space 268 and an enclosed space 270, with reliable communications being achieved between the GPS satellites 264 and the portable electronic device 102 and between the cellular tower 266 and the portable electronic device 102 in the open space 268, but not in the enclosed space 270. For example, the facility 262 may be automobile dealership, with the items 111 being various automobiles that can be selected to see, some of which are in an enclosed garage, which is part of the enclosed space 270, and others of which are in an open lot forming part of the open space 268. In another example, the facility 262 is a shopping center, with the parking area and an outdoor mall forming the open space 268, while a number of enclosed stores and combined to form the enclosed space 270.

Preferably, the local navigation app 120 includes a subroutine for determining which mode for finding a location of the portable electronic device 102 is the most reliable and for switching operation of the portable electronic device 102 as necessary to the more reliable mode. For example, such a determination is made by comparing signal strengths to check for attenuation and by comparing signal quality to check for reflections. Preferably, such a subroutine additionally makes a similar determination of which mode is more reliable for communications. Preferably, the server 110 within the system 260 is connected to a local navigation subroutine 114 as shown in FIG. 1, with navigation parameters being stored in a database 115 for calculating the location of the portable electronic device 102 through the use of either radio frequency signals from access points 108 and/or radio frequency transmitters 226, or from signals derived GPS satellites 264 and cellular towers 266. Alternately, choices between methods for determining the location of the portable electronic device 102 and between methods of communication with the server 110 may be provided by the individual using the portable electronic device 102, either as inputs to the local navigation program 120 or by means provided within a conventional smartphone, such as enabling or disabling GPS services and turning the Wi-Fi transceiver 126 on or off.

Other methods providing data describing fixed locations within the facility 262 may be additionally employed. For example, a number of machine readable tags 106 may be disposed at various locations within the facility 262, with each of the machine readable tags 106 including data describing its location. Then, as the portable electronic device 102 is moved through the facility 262, pictures taken of the machine readable tags 106 with the camera 130 provide the new location data needed in step 234 of FIG. 4. With the portable electronic device 102 additionally including a radio frequency identification (RFID) reader 144, RFID tags can be used in the same way, with new location data being generated as the portable electronic device 102 is brought into proximity with an RFID tag.

Figure 6:
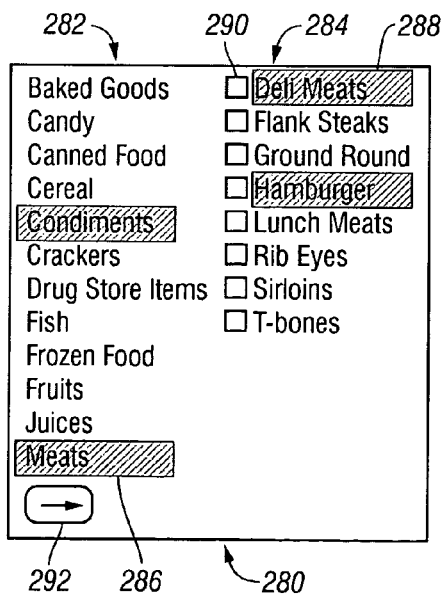
FIG. 6 is a display view showing a main menu screen displayed during the local navigation process of FIG. 4.

FIG. 6 is a view of a main menu screen 280 displayed in step 204 of the local navigation process 200, shown in FIG. 4. For example, the main menu screen 280 is shown as describing items 111 within a grocery store and as being divided into a category list 282 and an item list 284, with a different version item list 284 being associated with each category element 286 within the category list 282. Each version of the item list 284 is displayed in response to tapping, with a finger, the display 132 over the category element 286 with which the version of the item list 284 is associated. Each item element 288 in the item list 284 includes a check box 290 that is checked to indicate its selection for use in forming a path to visit selected items. The check box 290 is checked, or a check is removed therefrom, by tapping the display 282 over the item element 288. Preferably, information stored within the smartphone data base 117 is used to highlight the elements 286, 288 selected using this portable electronic device 102 during one or more previous to the facility 104. The elements displayed on the main menu screen 280 can be moved upward or downward as needed to view additional elements by dragging a finger upward or downward. When all of the desired item elements 288 have been selected, the "map" icon 292 is selected, causing the local navigation process 200 to proceed to step 208 to display messages and a map.

Figure 7:
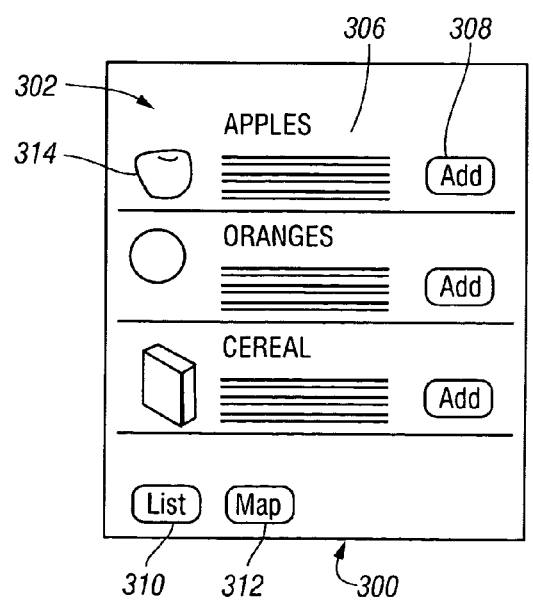
FIG. 7 is a display view showing a message screen displayed during the local navigation process of FIG. 4.

FIG. 7 is a view of a message screen 300 displayed in step 210 of the local navigation process 200. Each of the messages 302 contains graphics 304 and text 306 relating to one of the items 111. Preferably, the display of the messages 302 is arranged so that messages relating to items 111 close to the location of the portable electronic device 102, and to items 111 that have been previously chosen using the same portable electronic device 102 are shown first. Each of the items 111 shown in one of the messages 302 can be added to the list of items selected using the main menu screen 280 by tapping the display 132 at an item selection icon 308. At any time, a menu icon 310 may be selected to return to the main menu 282, i.e. to return to step 204, or a map icon 312 may be selected to go to the display of a map in step 218.

Figure 8:
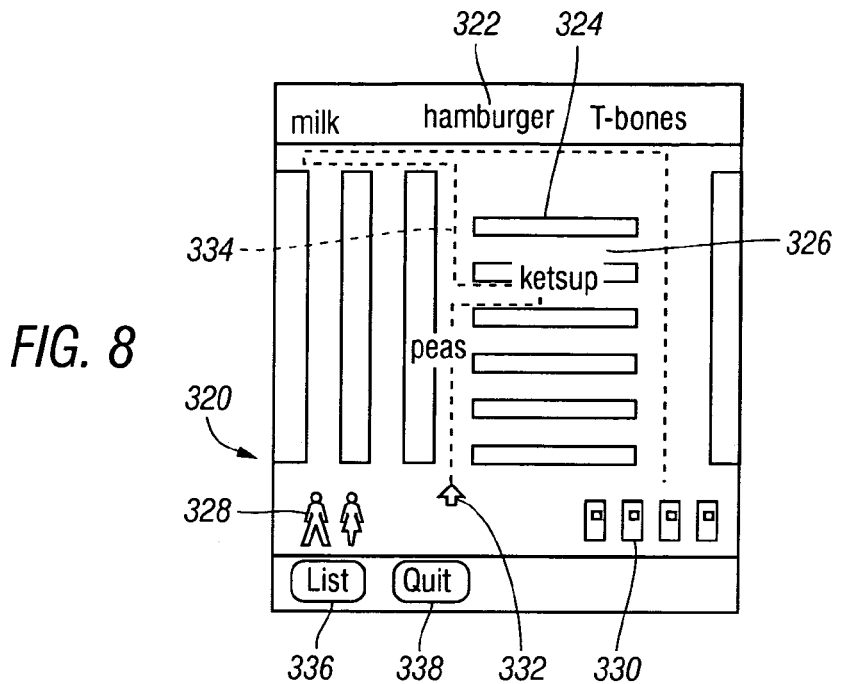
FIG. 8 is a display view showing a map displayed during the local navigation process of FIG. 4.

FIG. 8 is a view of a map screen 320 displayed in step 218 of the local navigation process 200, including icons 322 representing the locations of items 111 selected using the main menu screen 280 and the message screen 300. Because of space requirements, the icons 322 may be abbreviations, symbols, or color coded dots. The map screen 320 also shows stationary structures within the facility 104, such a counters 324 forming aisles 326, restrooms 328 and check-out locations 330. A cursor 332 shows the present, or most recently determined, location of the portable electronic device 102, and a path 334 indicates an optimum route for visiting all of the selected items 111, as determined in step 216. If it is determined in step 237 that the list icon 336 has been selected, the local navigation process 200 returns to step 204 to allow the editing of the list of selected items 111. If it is determined in step 242 that the session ending icon 338 has been selected, the local navigation process ends in step 240.

Figure 9:
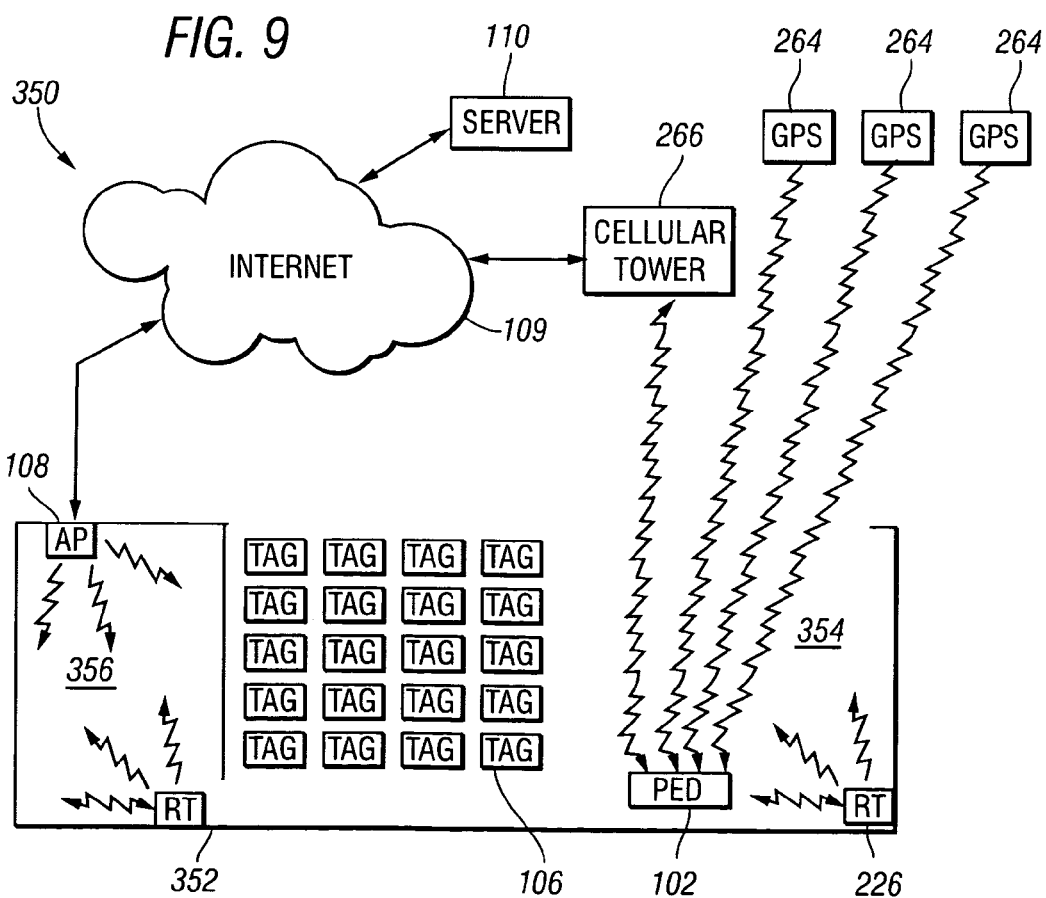
FIG. 9 is a schematic view of a system configured in accordance with a third embodiment of the invention.

FIG. 9 is a schematic view of a system 350 configured in accordance with a third embodiment of the invention to include a facility 352 having a parking area 354, in which an array of machine readable tags 106 is placed, with each of the machine readable tags 106 identifying a particular area where one or more vehicles can be parked, and with each of the machine readable tags 106 including unique information identifying the particular area with which the tag is associated. In the example of the figure, the parking area 354 is not enclosed, so that a portable electronic device 102 held therein can receive signals from GPS satellites 264 and with a cellular tower 266. In the example of the figure, he facility 352 additionally includes an enclosed area 356, in which communications are carried through an access point 108.

Figure 10:
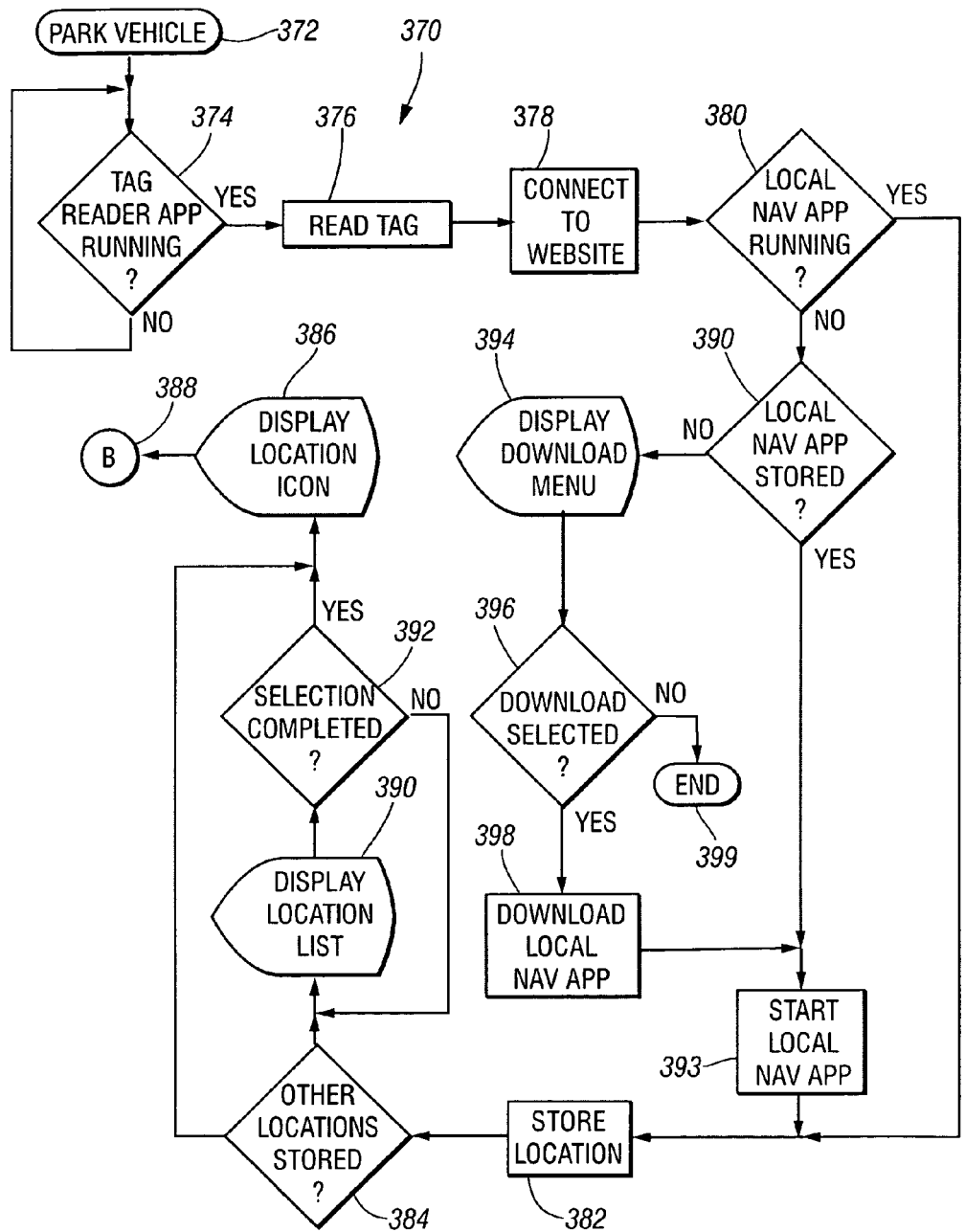
FIG. 10 is a flow chart showing an initialization process for initializing a local navigation process within a facility in the system of FIG. 9.

FIG. 10 is a flow chart showing an initialization process 370 for initializing the system 350 for operation within the parking area 354. The process begins in step 372 with parking a vehicle within the parking area 354. The tag reader app 142 must be running, as determined within step 374, to continue the initialization process 370 with the portable electronic device 102 in step 376 by reading the machine readable tag 106 closest to the location in which the vehicle has been parked. For example, if the machine readable tag 106 is a QR bar code tag, the user photographs the machine readable tag 106 with the camera 130 of the portable electronic device 102; if the machine readable tag 106 is an RFID tag, The user causes it to be read by the RFID reader 144 in the portable electronic device 102. In either case, the tag reader app 142 then causes the portable electronic device 102 to be connected to a website hosted by the server 110 in step 378, with the connection being made through a cellular tower 266 over a high-speed digital network or through an access point 108 over a Wi-Fi network. Next, in step 380, a further determination is made of whether the local navigation app 120 is running. If it is, the location of the machine readable tag 106 photographed in step 376, which is determined from the digital information of the machine readable tag 106, is stored in step 382. If it is then determined in step 384 that there are no other locations that have been stored in this way, a location icon is displayed in step 386 to indicate that the location of the bar code photographed in step 372 has been stored, with the initialization process 370 ending at exit point B, indicated as 388. If it is determined in step 384 that other such locations are stored, a list of such locations is displayed in step 390, providing a chance to delete unneeded previously stored locations. When it is then determined in step 392 that a process for selecting such locations is completed, the location icon is stored in step 385, with the initialization process 370 ending at exit point B, indicated as 388.

On the other hand, if it is determined in step 380 that the local navigation app 120 is not running within the portable electronic device 102, the server 112 makes a further determination in step 390 of whether the local navigation app 120 is stored within the portable electronic device 102. If it is, the local navigation app 120 is started in step 393, with the initialization process 370 then proceeding to step 382 to store the location. If it is instead determined in step 390 that the local navigation app 120 is not stored within the portable electronic device 102, the display 130 of the portable electronic device 102 displays, in step 394, a menu asking person using the portable electronic device 102 if he wishes to download the app 120. If it is then determined in step 396 that a selection has been made to download the local navigation app 120, this app 120 is downloaded in step 398, preferably from the server 112. Then the local navigation app 120 is started in step 392, with the initialization process 150 being successfully ended in step 388. If it is determined in step 396 that a selection has been made not to download the local navigation app 120, the initialization process 370 is ended in step 399.

Figure 11:
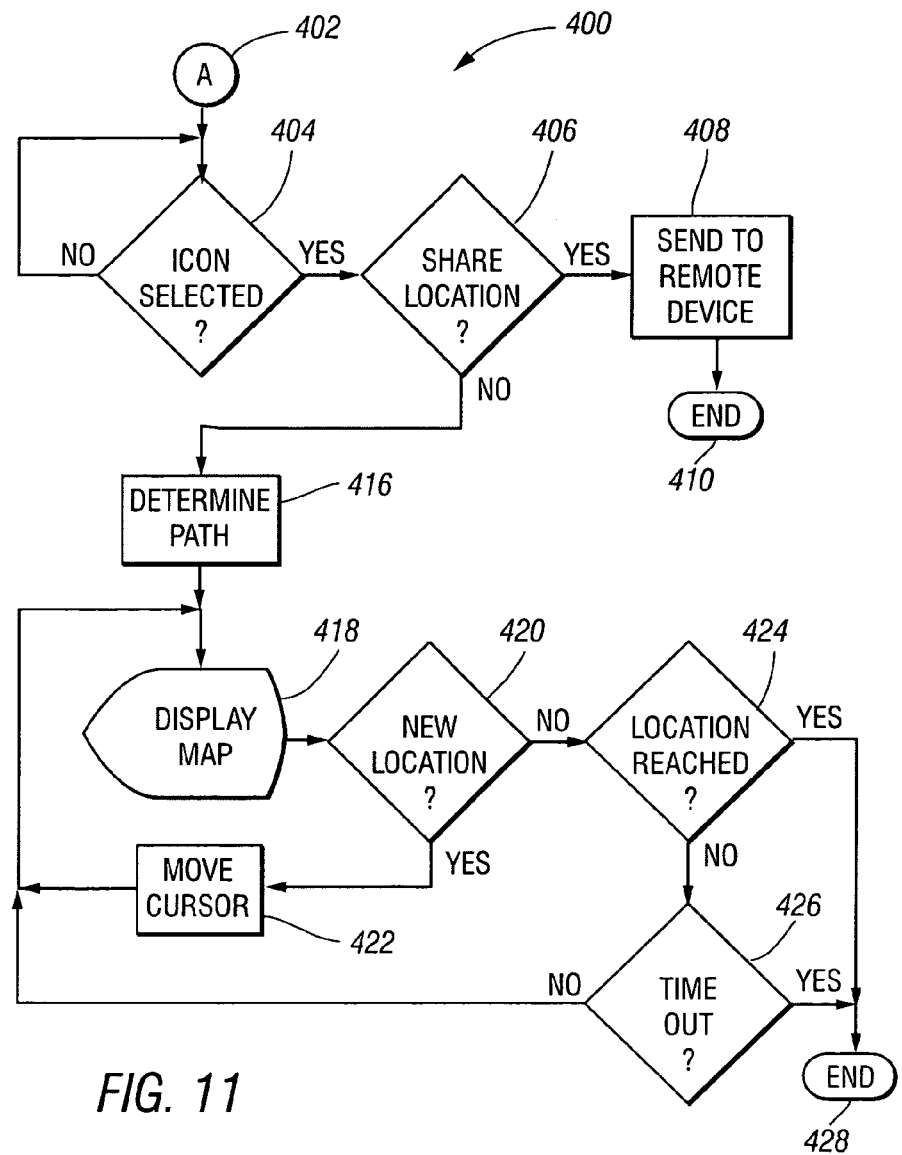
FIG. 11 is a flow chart showing operation of a local navigation process following the initialization process of FIG. 10 within the facility in the system of FIG. 9.

FIG. 11 is a flow chart showing operation of a local navigation process 400, which is started at an entry point B, indicated as 402, that is reached, for example, from exit point B, indicated as 388 within the initialization process 370, after the location icon has been turned on in step 386. It is noted that a substantial time may have expired between the completion of the initialization process 370 and beginning the local navigation process 410. For example, the local navigation process 400 may be used in an airport parking area to find a vehicle that has been left days or weeks earlier, with data describing its location being stored. In a preferred version of the third embodiment of the invention, a provision is made for sharing data derived from reading the machine readable tag 106 with a person using another portable electronic device 102. For example, one user may want his spouse to pick up a vehicle from an airport parking lot forming the facility 352.

Thus, when it is determined in step 404 that the location icon has been selected, a further determination is made in step 406 of whether the user wants of share the location with someone using a remote portable electronic device 102. If he does, he provides an input indicating where the information is to be sent, so that it is sent to the remote device 102 in step 408 using conventional processes, with the local navigation process 400 then ending in step 410. If it is determined in step 406 that the user has not selected an input causing the information to be shared, a path to the stored location is determined in step 416 and displayed on a map of the parking area 354 in step 418, with a cursor sowing the present location of the portable electronic device 102. When it is then determined in step 420 that the portable electronic device has been moved significantly, the cursor is moved on the displayed map in step 422. When it has been determined that the navigation process has been completed by moving the portable electronic device to the stored location as determined in step 424, or when a significant period has expired without a communication from the portable electronic device 102, as determined in step 426, the process 410 ends in step 428.

In the preceding discussion regarding FIGS. 10 and 11, it is assumed that the individual using the portable electronic device 102 needs help in finding his vehicle upon returning to the parking area 352, but that he does not need assistance in finding areas adjacent to the parking area 352. While this may often be the case, it is noted that the navigation process 200 may be applied following completion of the initialization process 370 and before starting the local navigation process 410. For example, the navigation process 200 may be applied within the enclosed area 356 of the facility 352 after leaving a vehicle in the parking area 354 and before returning to the parking area 354 to get the vehicle.

While the invention has been described in terms of preferred embodiments with some degree of particularity, it is understood that this description has been given only by way of example, and that many changes can be made without departing from the spirit and scope of the invention, as defined in the appended claims.

What is claimed is:

1. A method for finding one or more items within a facility, wherein the method includes steps comprising:
reading a machine readable tag within the facility to form data, wherein the facility includes a plurality of machine readable tags, each providing different data, wherein the facility includes a parking area, and wherein each of the machine readable tags in the plurality of machine readable tags is located adjacent one or more parking spaces;
receiving the data within a computing system in a portable electronic device;
generating a server address on a network from the data;
connecting the portable electronic device to a server over the network at the server address;
receiving a user selection describing an item to be visited within the facility, wherein the user selection is made by selecting a machine readable tag to be read within the plurality of machine readable tags, causing the machine readable tag to become the item to be visited, and wherein the location of the item to be visited is determined from the data provided by the machine readable tag;
determining a location of the item from a data structure accessed by the server;
determining a location of the portable electronic device within the facility; and
displaying an image of a map of the facility on the portable electronic device, wherein the map includes a cursor representing the location of the portable electronic device within the facility and an icon representing the location of the item, and wherein
the method includes an initialization process, performed when a vehicle is left within the parking area and a vehicle location process, performed to find the vehicle within the parking area, wherein data describing the location of the item to be visited is stored within the portable electronic device during the initialization process, and wherein the vehicle location process is started by a user selection made using the portable electronic device.

2. The method of claim 1, wherein
each machine readable tag is a bar code tag, the process of reading the machine readable tag comprises reading the data from a signal generated when the machine readable tag is photographed, and the server address is an address of a website hosted by the server.

3. The method of claim 1, wherein each machine readable tag is a radio-frequency identification tag.

4. The method of claim 1, wherein a stored location icon is displayed on the portable electronic device in response to storing the data describing the location of the item to be visited, and the vehicle location process is started by selecting the stored location icon.

5. The method of claim 4, additionally comprising determining that a selection has been made to send the data describing the location of the item to be visited to a remote portable electronic device and transmitting the data to be stored in the remote portable electronic device.

6. The method of claim 1, wherein the vehicle location process additionally comprises determining a path between the location of the portable electronic device and the location of the item to be visited.

7. The method of claim 6, wherein a location of the portable electronic device is repeatedly measured during the vehicle location process, with the cursor displayed on the map being moved to indicate changes in the location of the portable electronic device.

8. The method of claim 7, wherein the method comprises receiving user selections describing a plurality of items to be visited within the facility, determining a location of each of the items from the data structure accessed by the server, and displaying a message describing one or more of the items to be visited on the portable electronic device, and the image of the map includes icons representing the location of each of the items.

9. The method of claim 8, wherein the method additionally comprises determining a path from the location of the portable electronic device within the facility to visit each of the items in the plurality of items, and the image of the map includes a line representing the path.

10. The method of claim 9, wherein data describing a location of the portable electronic device within the facility is repeatedly generated, and the cursor is moved on the displayed image of the map to show movement of the portable electronic device within the facility.

11. The method of claim 10, additionally comprising displaying messages describing items determined to be in close proximity to the portable electronic device as the portable electronic device is moved within the facility.

* * * * *